US006614197B2

United States Patent
Berringer

(10) Patent No.: US 6,614,197 B2
(45) Date of Patent: Sep. 2, 2003

(54) ODD HARMONICS REDUCTION OF PHASE ANGLE CONTROLLED LOADS

(75) Inventor: Kenneth A. Berringer, Cedar Park, TX (US)

(73) Assignee: Motorola, Inc., Schaumburg, IL (US)

( * ) Notice: Subject to any disclaimer, the term of this patent is extended or adjusted under 35 U.S.C. 154(b) by 222 days.

(21) Appl. No.: 09/896,534

(22) Filed: Jun. 30, 2001

(65) Prior Publication Data

US 2003/0002302 A1 Jan. 2, 2003

(51) Int. Cl.$^7$ ................................................. H02P 1/24
(52) U.S. Cl. ...................... 318/245; 318/629; 318/632; 363/39; 363/41; 363/45; 323/235
(58) Field of Search ................................ 318/629, 632, 318/798, 799, 807, 808, 809, 811, 245; 323/235; 363/39, 41, 45, 57, 85, 96, 135

(56) References Cited

U.S. PATENT DOCUMENTS

| | | | |
|---|---|---|---|
| 3,569,841 A | * 3/1971 | Richman | 328/26 |
| 4,912,378 A | * 3/1990 | Vukosavic | 318/254 |
| 5,343,079 A | * 8/1994 | Mohan et al. | 307/105 |
| 5,548,165 A | * 8/1996 | Mohan et al. | 307/36 |
| 5,880,578 A | * 3/1999 | Oliveira et al. | 323/235 |
| 5,883,490 A | * 3/1999 | Moreira | 318/807 |
| 5,914,866 A | * 6/1999 | Eguchi et al. | 363/40 |
| 5,955,794 A | 9/1999 | Schulz et al. | 307/127 |
| 5,994,869 A | * 11/1999 | Becerra | 318/729 |
| 6,118,239 A | * 9/2000 | Kadah | 318/268 |
| 6,141,227 A | 10/2000 | Sheikh et al. | 363/41 |

FOREIGN PATENT DOCUMENTS

| | | |
|---|---|---|
| GB | 2 348 749 A | 10/2000 |
| JP | 09183900 | 2/1999 |
| JP | 11111897 | 11/2000 |

OTHER PUBLICATIONS

Ken Berringer et al., "Vacuum Cleaner Reference Platform", Motorola Inc. 2000, Motorola Semiconductor Application Note, AN1843, 39 pgs.

* cited by examiner

Primary Examiner—Bentsu Ro
Assistant Examiner—Rina I. Duda
(74) Attorney, Agent, or Firm—Joanna G. Chiu; Robert L. King

(57) ABSTRACT

The present invention relates generally to the reduction of odd harmonics of phase angle controlled loads. One embodiment relates to an apparatus for reducing odd harmonic currents introduced into an alternating current (AC) supply by a load having a zero crossing detector and a processor coupled to the zero crossing detector. The zero crossing detector is coupled to the AC current supply for measuring voltage zero crossings of the AC current supply. The processor receives a user control signal for controlling the load, such as, for example, a speed control, determines phase angles required at the voltage zero crossings of the AC current supply to implement the user control signal, and selectively modulating the phase angles when they are in a predetermined range of undesired phase angles in order to selectively reduce odd harmonics within the AC current supply.

20 Claims, 4 Drawing Sheets

| HARMONIC ORDER | MAXIMUM CURRENT (AMPS) |
|---|---|
| ODD HARMONICS ||
| 3 | 2.30 |
| 5 | 1.14 |
| 7 | 0.77 |
| 9 | 0.40 |
| 11 | 0.33 |
| 13 | 0.21 |
| 15≤n≤39 | 0.15 x 15/n |
| EVEN HARMONICS ||
| 2 | 1.08 |
| 4 | 0.43 |
| 6 | 0.30 |
| 8≤n≤40 | 0.23 x 8/n |

ODD HARMONICS REDUCTION OF PHASE ANGLE CONTROLLED LOADS

FIELD OF THE INVENTION

The present invention relates generally to harmonics reduction, and more specifically to odd harmonics reduction of phase angle controlled loads.

RELATED ART

Phase angle control may be used to control different types of AC loads. Phase angle control is a method of controlling the effective average voltage applied to a load by using an electronic switch and varying the conduction angle. Because the current waveform driving the loads are generally not sinusoidal waveforms, harmonic currents are introduced which causes distortion in the voltage waveforms. This distortion can also affect other loads that are coupled to the same power supply.

Active power correction circuitry used to reduce harmonics is often used in computer switchmode power supplies and some lighting applications. One known active power correction circuitry uses a boost power supply with a power MOSFET as the switching device. The power MOSFET controls the current flowing to the output. While the power MOSFET is applicable for low-power applications, it becomes prohibitively expensive above 1,000 Watts. Other switching devices that may be used in place of the power MOSFET, such as, for example, IGBTs (Insulated Gate Bipolar Transistors), have limited switching frequencies thus increasing the cost of other components within the power correction circuitry, such as boost inductors. Therefore, a need exists for effective phase angle control system that is capable of reducing harmonics while being able to handle higher power loads.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Figures 1, 2:
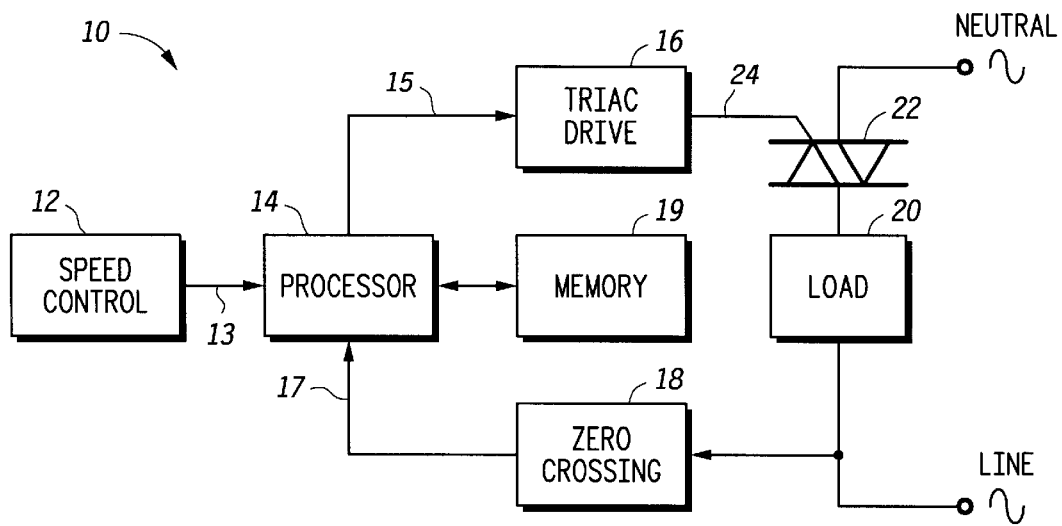
FIG. 1 illustrates in block diagram form a harmonics reduction system in accordance with one embodiment of the present invention.
FIG. 2 illustrates a table corresponding to a European power quality standard.

FIG. 1 illustrates in block diagram form, a harmonics reduction system 10 in accordance with one embodiment of the present invention. System 10 includes a processor 14, a speed control unit 12, a triac drive unit 16, a memory 19, a zero crossing unit 18, a triac 22, and a load 20. Processor 14 is coupled to speed control unit 12 (via conductor 13), triac drive unit 16 (via conductor 15), zero crossing unit 18 (via conductor 17), and memory 19. Processor 14 may be a microprocessor (MPU), microcontroller (MCU), a digital signal processor (DSP), a data processing system, or any other type of processor. Memory 19 may be an embedded memory within processor 14, or may include one or more external memory units. Memory 19 may be any appropriate type of memory, such as, for example, Flash, EEPROM, EPROM, ROM, RAM, MRAM, etc. Triac drive unit 16 is coupled to triac 22 (via conductor 24), where triac 22 receives the neutral input from an alternating current (AC) power supply (not shown) and is coupled to load 20. (Note that in place of triac 22, any thyristor may be used.) Load 20 is coupled to zero crossing unit 18, and receives the line input from the AC power supply. Zero crossing unit 18 also receives the line input. Therefore, the neutral and line inputs may correspond to an input power supply applied to load 20, such as, for example, a wall socket or other AC power supply, where the line input is the live input ideally having a sinusoidal waveform. However, due to loading of the AC power supply, the sinusoidal waveform is usually distorted, thus resulting in a non-sinusoidal AC power supply. Thus, the line input to load 20 may be non-sinusoidal.

In operation, system 10 provides phase angle control and reduces odd harmonics introduced by load 20. Load 20 may be any phase controlled load, such as, for example, a universal motor. System 10 may therefore be used in many appliances such as vacuum cleaners, light dimmers, heaters, power tools, washing machines, etc. Therefore, system 10 identifies particular phase angles where the harmonic current is above predetermined limits and applies an algorithm to strategically avoid them. For example, the predetermined limits on harmonic currents may be those mandated by government regulations, as will be discussed in reference to FIG. 2 below. Excessive harmonic currents causes many undesirable effects, such as, for example, introducing distortions into the voltage waveform, which may affect any other loads (e.g. appliances, etc.) coupled to the same power supply. Therefore, system 10 reduces noise, such as harmonic currents, in order to maintain power quality.

Speed control 12 provides a speed value (i.e. also referred to as a speed control signal) to processor 14, via conductor 13, indicative of a speed setting. (For example, in one embodiment, speed control 12 can be a knob on a motor that allows a user to select the desired motor speed.) This speed value corresponds to a desired phase angle to be applied to load 20. Processor 14 receives this speed value and determines the resulting output phase angle (also referred to as output firing phasing angle) that must be applied to triac 22 via triac drive unit 16 for proper control of load 20. (The details of determining the output phase angle will be discussed below in reference to FIGS. 4–6.) Triac drive unit 16 therefore applies a triggering current (also referred to as a load control signal) via conductor 24 to triac 22 such that triac 22 latches at the proper firing phase angle (corresponding to the output firing phase angle calculated by processor 14) and couples the neutral input to load 20. For example, if the output firing phase angle (derived from the input desired phase angle) is 60 degrees, triac drive unit 16 applies the triggering current such that triac 22 latches at 60 degrees before the next voltage zero crossing of the line input. Upon the line input voltage crossing the zero axis, triac 22 is released, thus decoupling the neutral input from load 20. Zero crossing unit 18 therefore provides a voltage zero crossing indicator to processor 14 when the line input voltage crosses the zero axis. Therefore, the firing phase angle of triac 22 refers to the number of degrees before the voltage zero crossing of the line input where triac 22 latches. Processor 14 uses the speed value received from speed control 12, the zero crossing indicator received from zero crossing unit 18, and instructions stored within memory 19 to reduce harmonic currents, as will be discussed in more detail below.

FIG. 2 illustrates, in table form, the standards for power quality in Europe as defined in EN61000-3-2. This standard has been adopted by the European Community and is a requirement for CE approval. Therefore, this is one example of limits placed on harmonic currents; however, system 10 may target any predetermined limit on harmonic currents, as appropriate. As see in table 26, various limits are given on each harmonic current, both even and odd. The harmonic current limit (i.e. maximum harmonic current) for an odd harmonic falling between 15 and 39, inclusively, can be calculated by dividing the odd harmonic number into 15 and multiplying the result by 0.15. Similarly, the harmonic current limit (i.e. maximum harmonic current) for an even harmonic falling between 8 and 40, inclusively, can be calculated by dividing the even harmonic number into 8 and multiplying the result by 0.23. Note that the limit (maximum harmonic current) on the third harmonic according to the European standard is 2.3 Amps. Generally, the third harmonic current for phase angle controlled applications is problematic and can detrimentally distort the power quality. Therefore, system 10 of FIG. 1 can be used to ensure that the third harmonic current does not surpass 2.3 Amps. Although the third harmonic will be used as an example herein, the embodiments described herein may be used to reduce any odd harmonics within system 10, and is not limited to the third harmonic. Likewise, the European standard defines the limit on the third harmonic current as 2.3 Amps; however, any predetermined limit may be set.

Figure 3:
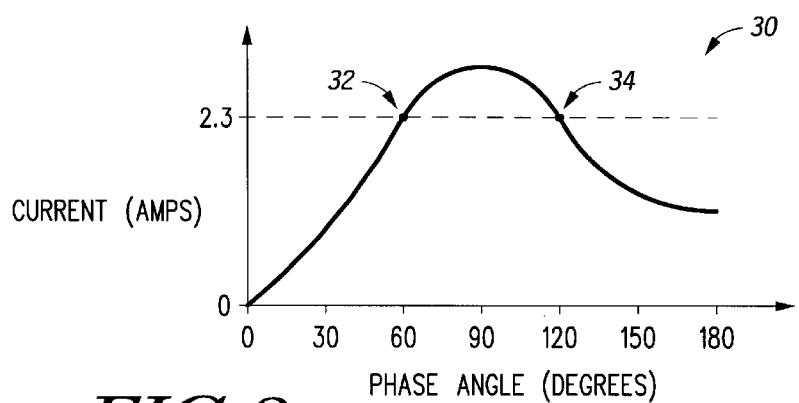
FIG. 3 illustrates, in graph form, a third harmonic current in accordance with one embodiment of the present invention.

FIG. 3 illustrates, in graph form, the harmonic current corresponding to the third harmonic of an AC power supply. Graph 30 graphs one example of a third harmonic current with respect to the firing phase angle of triac 22. Note that in this example, the third harmonic current surpasses its 2.3 Amps limit between the firing phase angles of 60 and 120 degrees (corresponding to points 32 and 34 of FIG. 3, respectively). Therefore, this range is identified as problematic or undesirable where the harmonic current should be reduced.

Figure 4:
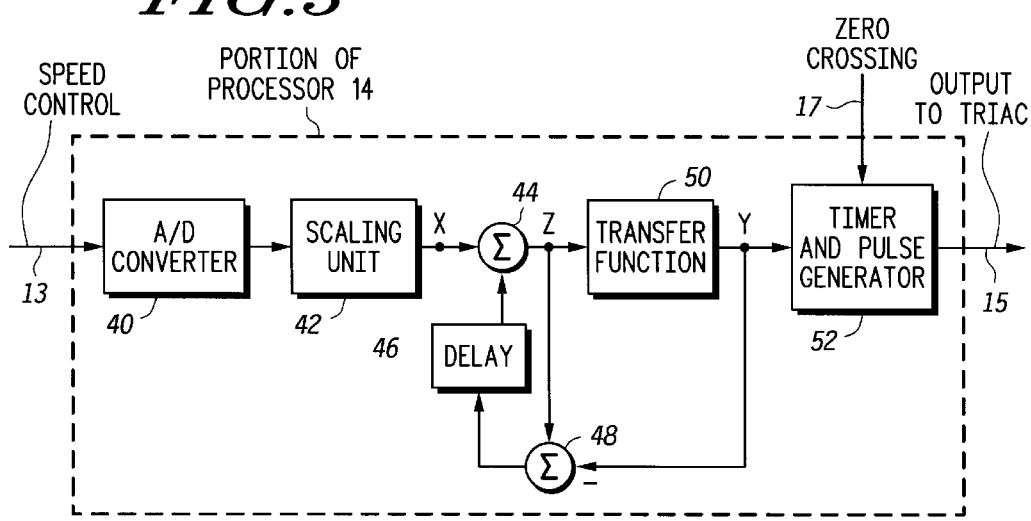
FIG. 4 illustrates, in block diagram form, a portion of the processor of FIG. 1 in accordance with one embodiment of the present invention.
Figure 5:
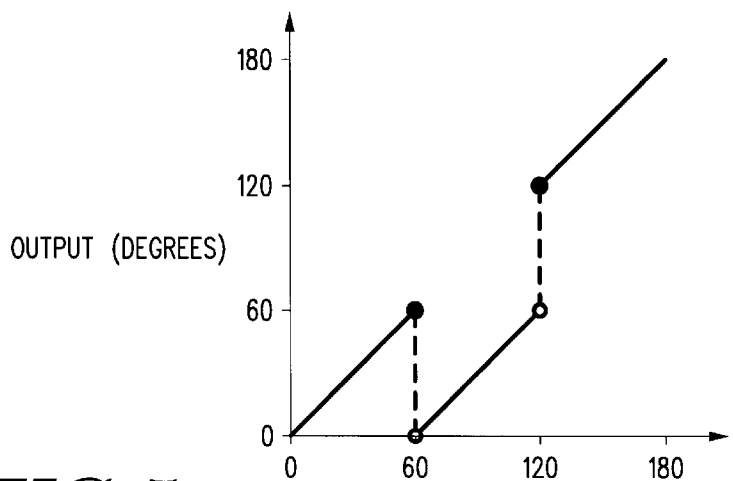
FIG. 5 illustrates, in graph form, a transfer function in accordance with one embodiment of the present invention.

FIG. 4 illustrates, in block diagram form, one embodiment of a portion of processor 14. Processor 14 includes an A/D (analog to digital) converter 40, scaling unit 42, summers 44 and 48, delay unit 46, transfer function 50, and timer and pulse generator 52. A/D converter 40 receives the speed value via conductor 13 from speed control 12 and is coupled to scaling unit 42. Scaling unit 42 provides the desired input phase angle (X) to summer 44. Summer 48 is coupled to delay unit 46 which is coupled to summer 44. Summer 44 provides an error modified desired phase angle (Z) to summer 48 and transfer function 50. Transfer function 50 provides the output phase angle (Y) to summer 48 and timer and pulse generator 52. Timer and pulse generator 52 also receives the zero crossing indicator from zero crossing unit 18 via conductor 17, and provides an output to triac drive unit 16 via conductor 15.

In operation, A/D converter 40 receives the speed value from speed control 12 and converts it to a digital value. In one embodiment, speed control 12 is a potentiometer capable of providing a variety of speed values to A/D converter 40. Scaling unit 42 receives the digital value from A/D converter 40 and scales it to fall into a predetermined range. For example, in one embodiment, scaling unit 42 scales the digital values received from A/D converter 40 to values between 0 and 180 such that they correspond directly to a desired input phase angle received from speed control unit 12. Therefore, a particular setting on speed control 12 is converted to a desired phase angle (X) that will result in the desired speed of load 20, which in one embodiment, may be a universal motor. (Note that although speed control is being used as an example, other loads may have other variable phase angle controls other than speed, such as brightness control for incandescent lights, temperature control for heaters, etc.) Summers 44 and 48, delay unit 46, and transfer function 50 operate to modulate X into an output phase angle (Y) where Y corresponds to the firing phase angle of triac 22. Summer 44 receives X and an error (i.e. an error phase) calculated from a previous half cycle (calculated by summer 48 and provided to delay unit 46 such that the error is held from a previous half cycle to a subsequent half cycle) and provides the error modified desired phase angle (Z) to transfer function 50. Transfer function 50 is further defined in FIG. 5 which illustrates, in graph form, the translation of the error modified desired phase angle (Z) received from summer 44 to the output Y. For example, if Z is between 0 and 60 degrees, inclusively, or between 120 and 180 degrees, inclusively, Y remains the same as Z (e.g. Y=Z). However, if Z is between 60 and 120 degrees, exclusively, then it gets translated down by 60 degrees (i.e. a predetermined correction phase angle) prior to being output as Y (Y=Z−60). Operation of summers 44 and 48, delay unit 46, and transfer function 50 will be described further in reference to FIGS. 6 and 8. Note that summers 44 and 48, delay unit 46, and transfer function 50 can be implemented in hardware, software, or in a combination of hardware and software. For example, they can be implemented in software stored in memory 19.

Timer and pulse generator 52 receives the output firing phase angle (Y) and the zero crossing indicator and provides an indicator via conductor 15 to triac drive unit 16, which applies the triggering current (e.g. a pulse) to triac 22. Timer and pulse generator 52 calculates an amount of time to wait from a zero crossing prior to firing triac 22. Upon reaching a next zero crossing (indicated via conductor 17), timer and pulse generator 52 waits for the calculated amount of time prior to indicating to triac drive unit 16 (via conductor 15) to generate a pulse such that triac 22 fires at the firing phase angle Y. Thus, in this embodiment, the firing phase angle Y calculated in a current half cycle is not applied until the subsequent half cycle. However, in alternate embodiments, the firing phase angle Y may be applied in the current half cycle or any subsequent half cycle.

Figure 8:
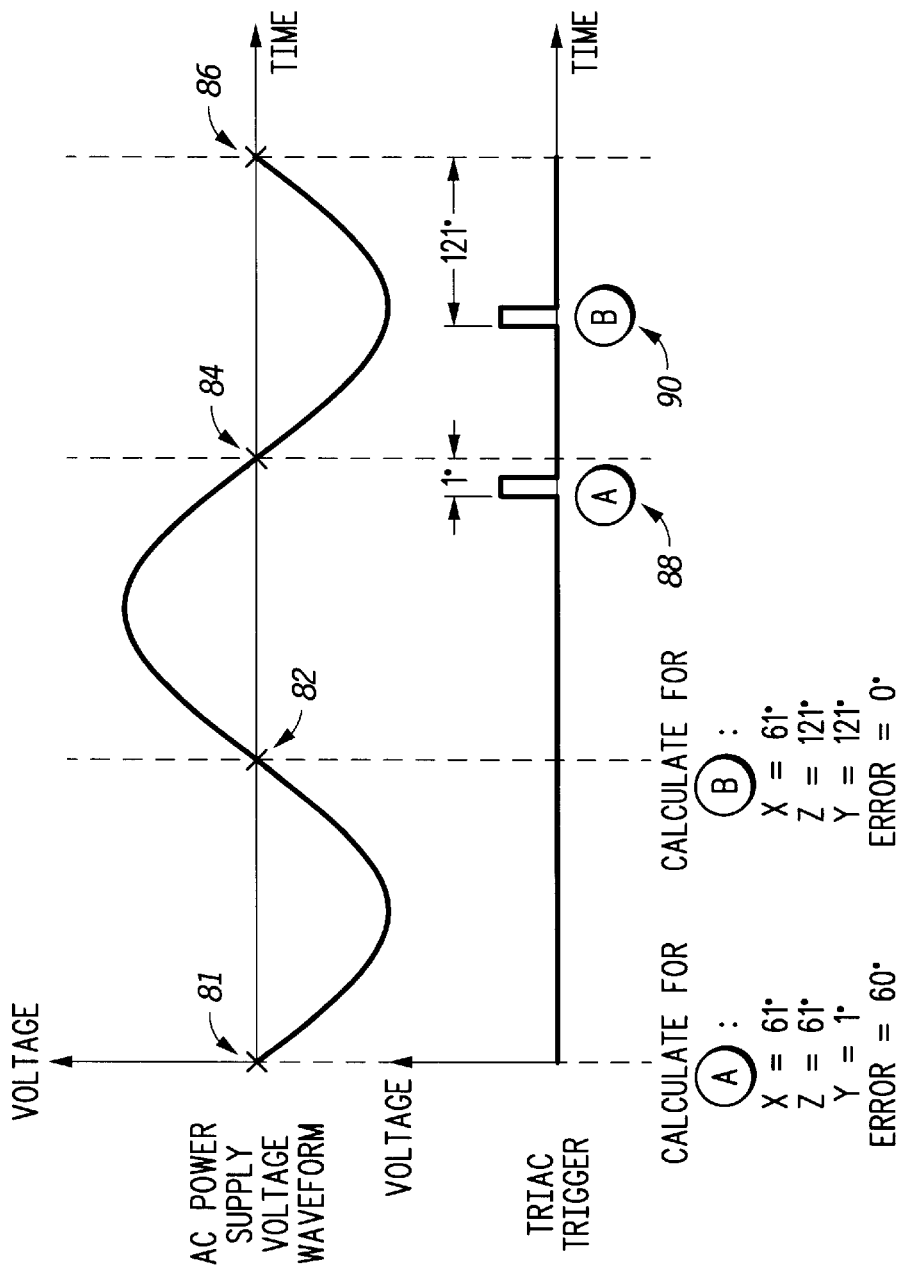
FIG. 8 illustrates, in graph form, an AC power supply voltage waveform and a triac trigger in accordance with one embodiment of the present invention.

Operation of summers 44 and 48, delay unit 46, and transfer function 50 therefore allows the time average of output phase angle (Y) over two half cycles to be approximately equivalent to the desired (input) phase angle (X). This is illustrated in the example of FIG. 8 where FIG. 8 illustrates, in graph form, one example of the operation of processor 14 corresponding to the third harmonic current of FIG. 3. FIG. 8 illustrates an AC power supply voltage waveform (the top waveform) having zero crossings at points 81, 82, 84, and 86. At the first zero crossing 81 illustrated in FIG. 8, an example is given where the desired input phase angle (X) is calculated to be 61 degrees. The error modified desired phase angle (Z) is therefore also 61 degrees (assuming the error from the previous half cycle was zero degrees). Since Z falls within the problem range of 60 to 120 degrees (see FIG. 3), 60 degrees is subtracted from Z to produce the output phase angle Y for the subsequent half cycle (see also FIG. 5). Therefore, timer and pulse generator 52 receives Y (which is 1 degree in this example) and calculates the amount of time to wait between a zero crossing and firing triac 22 at 1 degree. Upon finishing this calculation, which is generally finished early in the current half cycle (i.e. shortly after zero crossing 81 or at least prior to zero crossing 82), timer and pulse generator 52 waits for a next zero crossing, zero crossing 82, and then waits the previously calculated amount of time (between point 82 and the start of pulse 88) before causing the triac trigger pulse 88 to fire. Also, at this next zero crossing 82, calculations are initiated for the subsequent half cycle (starting at zero crossing 84). The error calculated previously (60 degrees) is added to X to obtain Z. The value of Z is now 121 degrees which falls out of the problematic range. Therefore, Y remains the same as Z and the new error (Z minus Y) to be used in the subsequent half cycle (starting at zero crossing 84) is 0. The calculations completed after zero crossing 82 are then used by timer and pulse generator 52 after zero crossing 84 to provide triggering current pulse 90 at a firing angle of 121 degrees (corresponding to Y). Therefore, it can be seen that the time average of Y ((1+121)/2=61 degrees) is approximately equivalent to X (also 61 degrees).

Alternate embodiments may use a time average over more than two half cycles. For example, the range can be increased from 60 to 120 degrees to 45 to 135 degrees by modulating over a wider range. For example, if the desired phase angle (X) is between 45 and 90 degrees, 45 degrees is subtracted from the output phase angle. If the desired phase angle (X) is between 90 and 135 degrees, 45 degrees is added to the output phase angle. This results average to the desired angle over three half cycles.

Also note that any of the units described above, such as, for example, A/D converter 40, scaling unit 42, and timer and pulse generator 52, may be implemented in hardware, software, or a combination of hardware and software. Furthermore, the software may be stored in a memory unit, such as, for example, memory 19 for access by processor 14.

Figure 6:
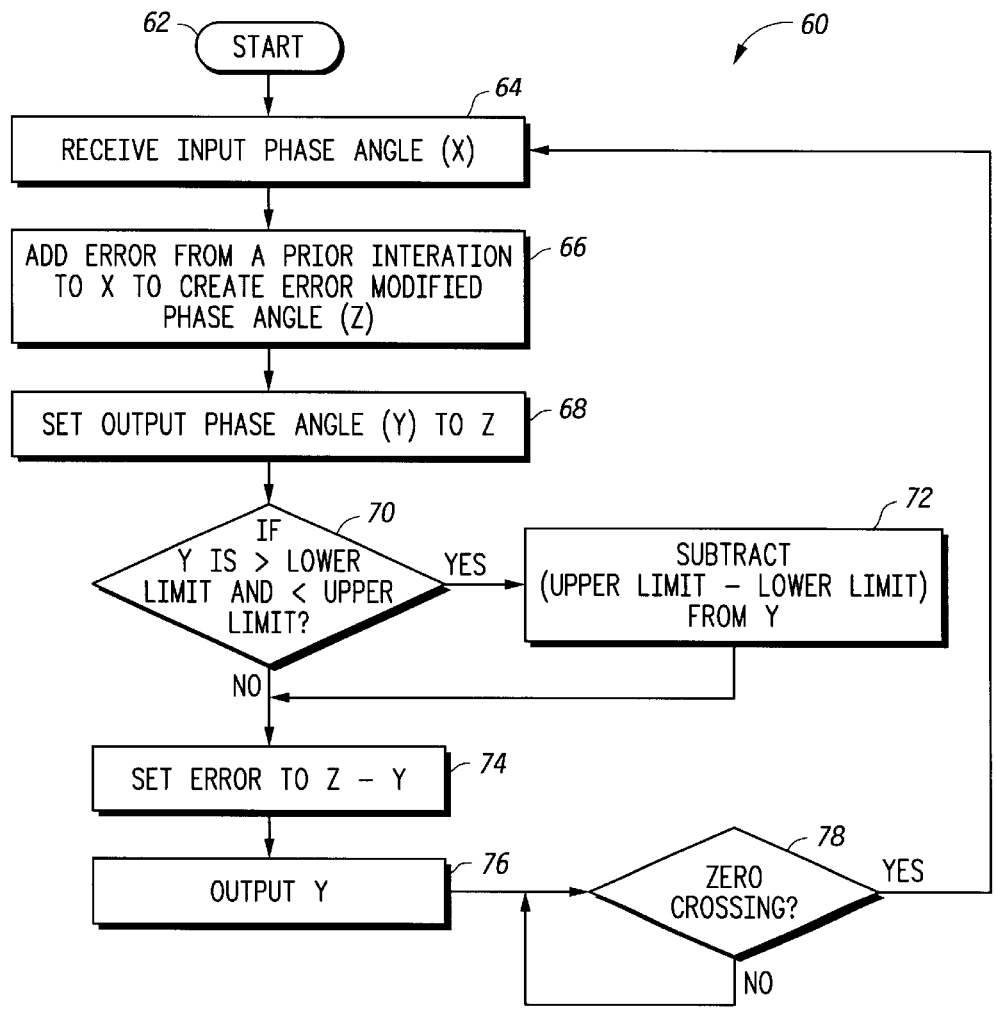
FIG. 6 illustrates, in flow diagram form, a method for reducing harmonics in accordance with one embodiment of the present invention.

FIG. 6 illustrates in flow diagram form, a method for reducing odd harmonics according to one embodiment of the present invention that may be used in processor 14. Flow 60 of FIG. 6 corresponds to the operation of summer 44 and 48, delay unit 46, transfer function 50 of FIG. 4. Flow 60 begins at start 62 and proceeds to block 64 where the desired input phase angle (X) is received (where X may be derived from the speed value received from speed control 12, as described above). Flow continues to block 66 where an error from a prior iteration is added to X to create an error modified phase angle (Z). (If this is the first iteration, the error is initialized to zero.) Therefore, block 66 may correspond to summer 44, where the output of summer 44 is Z. Flow continues to block 68 where the output phase angle (Y), corresponding to the triac firing phase angle, is set to Z. Then, at decision diamond 70, it is determined whether Y is greater than a predetermined lower limit and less than a predetermined upper limit. These limits correspond to the problem area being avoided. For example, in the case of attempting to reduce the third harmonic current illustrated in FIG. 3, the problem area occurs between the firing phase angles of 60 and 120 degrees. Therefore, in this example, the lower limit may be set to 60 and the upper limit set to 120. If Y is greater than the lower limit and less than the upper limit, flow proceeds to block 72 where the difference between the upper and lower limits (i.e. upper limit minus the lower limit, also referred to as the predetermined correction phase angle) is subtracted from Y (thus modifying Y). This may be performed by transfer function 50 in FIG. 4. In the example of the third harmonic current of FIG. 3, if Y were between 60 and 120 degrees, exclusively, 60 degrees would be subtracted from Y such that Y would no longer be in the problem range of 60 to 120 degrees. Flow then proceeds to block 74. If, at decision diamond 70, Y is not greater than the lower limit and less than the upper limit, Y remains unmodified, and flow proceeds to block 74 where the error value for the current cycle is set to Z minus Y. This may be performed by summer 48 in FIG. 4. This error will be used in the next iteration through flow 60 (at block 66). Flow proceeds to block 76 where Y is output for subsequent processing (for example, Y may be provided to timer and pulse generator 52 of FIG. 4). Flow proceeds to decision diamond 78 where it is determined whether a next zero crossing has been reached. If not, flow returns to decision diamond 78 until a next zero crossing is reached, at which point flow returns to block 64. Therefore, in block 66, the error from the previous iteration is used. As described above, flow 60 reduces the third harmonic current of FIG. 3 and allows the time average of output phase angle (Y) over two half cycles to be approximately equivalent to the desired (input) phase angle (X).

Figure 7:
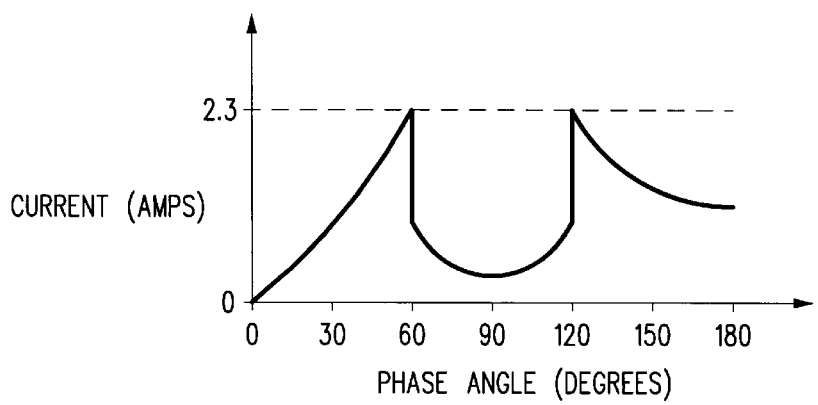
FIG. 7 illustrates, in graph form, a third harmonic current in accordance with one embodiment of the present invention.

FIG. 7 illustrates, in graph form, the results from applying the flow of FIG. 6. Therefore, flow 60 modulates the desired phase angle (X) such that the output firing phase angle (Y) avoids the problematic range. Therefore, as can be seen in the graph of FIG. 7, which is similar to FIG. 3, the third harmonic current remains below 2.3 Amps. Therefore, it can be appreciated how processor 14 and flow 60 can help reduce odd harmonic currents. Although the above description used the third harmonic current with a 2.3 Amp limit as an example, processor 14 and flow 60 can be modified to take care of any problematic range of firing phase angles for triac 22. For example, the upper and lower limits described in FIG. 6 can be set to define any problematic or undesirable range where different predetermined correction phase angles may be used to adjust the phase angles from falling within the predetermined range. Alternatively, the methods and systems herein may be used for reducing any signal element from a signal within a problematic range, and not just harmonic currents.

In the foregoing specification, the invention has been described with reference to specific embodiments. However, one of ordinary skill in the art appreciates that various modifications and changes can be made without departing from the scope of the present invention as set forth in the claims below. For example, any software taught herein may be embodied on one or more of computer hard disks, floppy disks, 3.5" disks, computer storage tapes, magnetic drums, static random access memory (SRAM) cells, dynamic random access memory (DRAM) cells, electrically erasable (EEPROM, EPROM, flash) cells, nonvolatile cells, ferroelectric or ferromagnetic memory, compact disks (CDs), laser disks, optical disks, and any like computer readable media. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. Apparatus for reducing odd harmonic current introduced into an alternating current supply by a load, comprising:
   zero crossing detection means coupled to the alternating current supply for measuring voltage zero crossings of the alternating current supply; and
   processing means coupled to the zero crossing detection means, the processing means receiving a user control signal for controlling the load, the processing means determining phase angles required at the voltage zero crossings of the alternating current supply to implement the user control signal, and selectively modulating the phase angles when the phase angles are within a predetermined range of an undesired phase angle, the selectively modulating reducing odd harmonics within the alternating current supply.

2. The apparatus of claim 1 wherein the load is a motor and the user control signal is a speed control signal for controlling speed of the motor.

3. The apparatus of claim 1 wherein the undesired phase angle is approximately ninety degrees to significantly minimize a third harmonic of the alternating current supply.

4. The apparatus of claim 1 wherein the predetermined range comprises a range substantially within 30 to 60 degrees wide.

5. The apparatus of claim 1 further comprising:
   a thyristor for receiving a load control signal from the processing means.

6. The apparatus of claim 1 wherein the processing means selectively modulates by subtracting a predetermined correction phase angle from a phase angle within the predetermined range and determining an error phase, the error phase being added to a subsequent phase angle within the predetermined range to average modification of the phase angle.

7. The apparatus of claim 1 wherein the processing means further comprises a microcontroller unit (MCU) and the load is a universal motor.

8. A method for reducing odd harmonics in an alternating current supply, comprising:
   receiving a user command to control a load;
   determining a phase angle at each zero crossing of the alternating current supply required to implement the user command;
   identifying a predetermined range of phase angles to modulate around;
   not modifying the phase angle if the phase angle is less than the predetermined range of phase angles;
   modifying the phase angle by performing one of selectively adding and selectively subtracting a predetermined phase from the phase angle if the phase angle is within the predetermined range of phase angles;
   calculating an error in response to modifying the phase angle;
   adding the error to a subsequent phase angle so that an average phase angle equals required phase angle modification required to implement the user command; and
   not modifying the phase angle if the phase angle is greater than the predetermined range of phase angles.

9. The method of claim 8 further comprising implementing the predetermined range of phase angles as substantially between sixty degrees and one hundred twenty degrees.

10. The method of claim 8 further comprising implementing the predetermined range of phase angles as a range centered substantially around ninety degrees to substantially reduce third harmonics in the alternating current supply.

11. The method of claim 8 further comprising implementing the user command as a speed control signal and implementing the load as a motor.

12. The method of claim 8 further comprising:
    coupling modified or non-modified phase angles to a thyristor to control switching of the alternating current supply to the load.

13. A computer readable medium storing software for reducing odd harmonics in an alternating current introduced by a load, the computer readable medium comprising:
    at least one instruction for determining a phase angle at each zero crossing of the alternating current required to implement a user command to control the load;
    at least one instruction for determining if the phase angle at each zero crossing is within or outside a predetermined range of phase angles to modulate around and not changing the phase angle if the phase angle is outside of the predetermined range; and
    at least one instruction for changing the phase angle by forming a differential between a predetermined phase angle and the phase angle if the phase angle is within the predetermined range, for calculating an error value associated with the phase angle, and for adding the error value to a subsequent phase angle so that an average of two successive phase angles will accurately implement the user command.

14. The computer readable medium of claim 13 further comprising implementing the predetermined range substantially around ninety degrees to minimize third harmonics.

15. The computer readable medium of claim 13 further comprising implementing the load as a motor and processing the user command to variably change motor speed.

16. The computer readable medium of claim 13 wherein the computer readable medium is an embedded memory within a system for controlling the load.

17. A system for reducing odd harmonic current introduced into an alternating current supply by a load, comprising:
    a zero crossing detector coupled to the alternating current supply for measuring voltage zero crossings of the alternating current supply; and
    a processor coupled to the zero crossing detector, the processor receiving a user control signal for controlling the load, the processor determining phase angles required at the voltage zero crossings of the alternating current supply to implement the user control signal, and selectively modulating the phase angles when the phase angles are within a predetermined range of an undesired phase angle, the selectively modulating reducing odd harmonics within the alternating current supply.

18. The system of claim 17 wherein the load is a motor and further comprises:
    a triac coupled in series between the motor and the alternating current supply, the triac being controlled by the processor to switch a neutral phase of the alternating current supply to the motor in response to selectively modulating the phase angles.

19. The system of claim 17 further comprising:
a speed control device coupled to the processor, the speed control device providing the user control signal to the processor for controlling speed of the load.

20. The system of claim 17 further comprising:
a memory coupled to the processor, the memory storing software that when executed by the processor implements selective modulation of phase angles by the processor.

* * * * *